Jan. 7, 1941.  R. E. NELLES  2,228,034
MONORAIL TROLLEY DRIVE
Filed Oct. 19, 1938
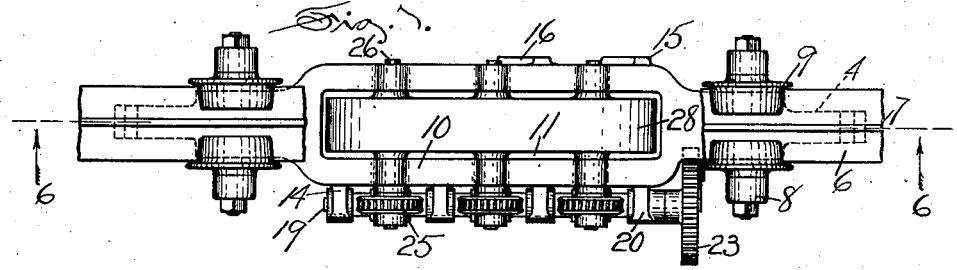
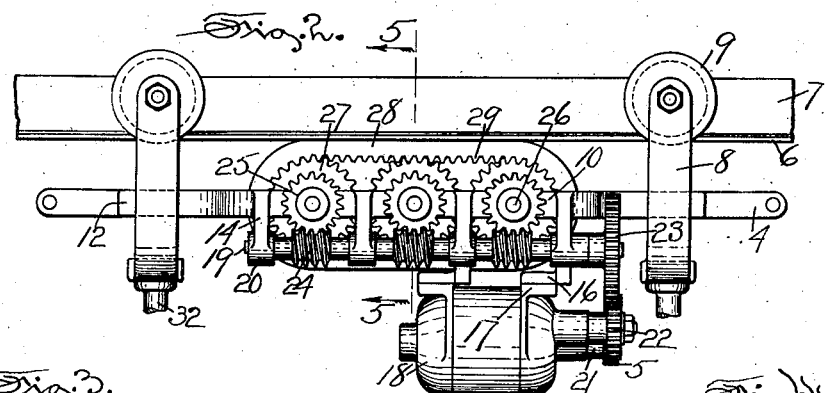
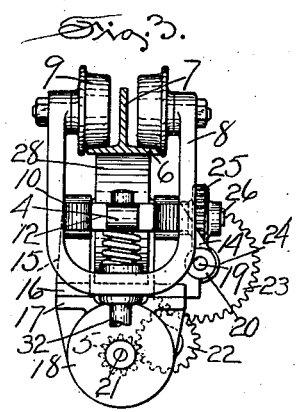
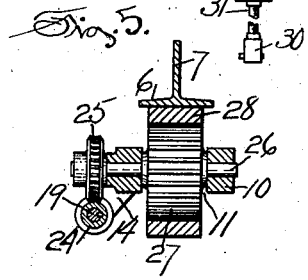
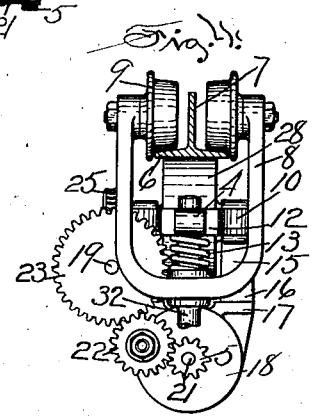
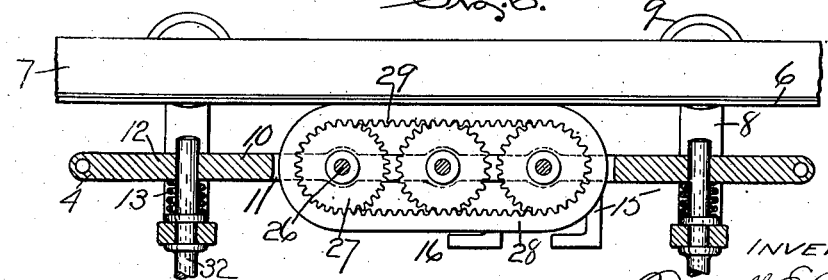
INVENTOR
Russell E. Nelles.
by Arthur B. Jenkins
ATTORNEY Patented Jan. 7, 1941

2,228,034

UNITED STATES PATENT OFFICE 2,228,034

MONORAIL TROLLEY DRIVE

Russell E. Nelles, South Orange, N. J., assignor to The Union Manufacturing Company, New Britain, Conn., a corporation of Connecticut Application October 19, 1938, Serial No. 235,770

2 Claims. (Cl. 105—30)

My invention relates to driving mechanism for trolleys or carriers of loads generally supported by and suspended from a single rail, and an object of my invention, among others, is the production of a driving mechanism for such carriers having maximum traction powers combined with minimum size and that shall be simple in construction and operation and particularly efficient in the results obtained by its use.

One form of a driving mechanism embodying my invention and in the construction and use of which the objects herein set out, as well as others, may be attained is illustrated in the accompanying drawing, in which—

Figure 1 is a top plan view of my improved driving mechanism, the supporting rail being broken away to illustrate the driving unit.

Figure 2 is a view in side elevation of said mechanism.

Figure 3 is an end view.

Figure 4 is a similar view but looking in an opposite direction.

Figure 5 is a view in section on a plane denoted by the dotted line 5—5 of Fig. 2.

Figure 6 is a view in section on a plane denoted by the dotted line 6—6 of Fig. 1.

My improved driving device is particularly applicable for use in the conveyance of loads over so-called monorail systems, and it comprises a driving unit, which will be hereinafter referred to as the driver, and which may directly support and carry the load, but perhaps more frequently it will be employed to tow or move one or more trailer units which may be coupled thereto in any suitable manner. The structures of these suspended monorail systems are such that the drivers and conveyors or carriers must be confined within restricted limits both endwise and widthwise as well as in the direction of depth in order to avoid interference with other parts of the system, it being particularly essential that the width of the driver shall be confined within as narrow limits as possible. My improved driver illustrated and described herein possesses the qualities above mentioned, the structure being such that a most tenacious grip of the traction member upon the rail is obtained so that the entire power transmitted to the traction member is conveyed to the rail and effectively resisted thereby, thereby avoiding slipping action between the traction member and the rail and providing a maximum amount of contacting surface between the traction member and the rail. I obtain these results by employing a traction member in the form of an endless cog drive belt provided with any suitable tread for contact with the supporting rail and driven by cog drivers, the teeth of which mesh with the cog teeth of a rack on the endless cog drive belt, this form of a traction member and its means of support affording a most efficient traction element confined within a minimum space and possessing maximum pulling or driving powers.

In the accompanying drawing the numeral 7 denotes a supporting rail of inverted T-shape common to monorail systems for hoisting and carrying loads and 8 denotes yokes for trolleys 9 rotatably mounted in the arms of the yokes and spaced to travel upon the flanges of the rail 7, as shown in Figs. 2 and 3 of the drawing. The driving unit including said yokes also comprises a load bar in the form of a frame having side bars 10 with an opening 11 between them and with shanks 12 projecting from each end and resting on springs 13 seated on the yokes 8, the base of the unit being thus supported by the yokes and forced by the springs toward the rail, a traction member to be described being forced into driving contact with said rail. Draw bars 4 are formed at the ends of the shanks 12 for attachment of trailer units in a manner that will be readily understood.

Supporting wings 14 extend laterally and downwardly from one side of the load bar and similar wings 15 project from the opposite side of the load bar, as shown there being two of these wings each having a foot as shown in Fig. 6 and the two opposite wings 14 each has a similar foot 16 as shown in Fig. 2. These feet comprise supports for foot-like supports 17 of a motor 18, preferably of the electric type, as shown in Fig. 2 of the drawing.

A drive shaft 19 is supported in bearings 20 at the ends of the wings 14, said shaft being connected with the motor spindle 21 by a train of gears including a pinion 5 secured to the motor spindle, an intermediate gear 22 intermeshing with the pinion and with a gear 23 secured to the shaft 19 as shown in Fig. 4 of the drawing. Worms 24 secured to the shaft 19 mesh with worm wheels 25 secured to belt supporting shafts 26 rotatably mounted in the sides 10 of the load bar, as shown in Fig. 5 of the drawing. These shafts each supports a cog driver 27, and an endless cog drive belt 28, is supported upon said cog drivers, said cog drive belt having cog teeth 29 meshing with the teeth of the cog drivers as shown in Fig. 2 of the drawing.

This endless cog drive belt as shown herewith may be of any suitable construction, preferably of fabric, with a durable wearing surface or tread of any suitable material that travels along the flanges 6, but it may embody any of the well known cord fabric constructions in use at the present time and found in traction belts or automobile tires and the like. The operation of the motor may be effected by means of a manually operated switch 30 at the end of a cable 31 in a manner common to electric drives of this type. A hoisting mechanism of any suitable type may be suspended in any desired manner from the driving unit, as from a rod or rods 32 secured to and depending from the yoke 8, and as shown in Figs. 2 and 6 of the drawing, or separate hoisting units with supporting trailers may be utilized as a trailer unit as hereinbefore explained.

Electricity for driving the motor may be supplied to it in any suitable manner by any of the well known means for supplying current to moving objects, as by the use of conducting wires or flexible conductor cable, the switch 30 being connected in any well-known manner to control supply of current to the motor.

The driving connection with the motor may be of any desired kind, a geared connection of any desired type having been found by me to produce satisfactory results.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. In a driving mechanism for monorail trolleys, pairs of wheels arranged to travel along a monorail, a yoke depending from each pair of wheels, a load bar including an intermediate frame portion and draw bar end portions extending through said yokes, a motor power unit mounted on the intermediate frame portion of the load bar and including an endless drive belt and driving means for said belt, a spring device interposed between the lower cross member of each yoke and the under side of the draw bar end portion of the load bar at a point coincident with the center line of said yoke and operative to exert upward pressure on the load bar from moving the upper run of the endless belt of the power unit into driving frictional contact with the lower surface of the bottom flange of the monorail, means for retaining the load bar, yokes, and spring devices in assembled relation and wherein load suspension means is carried by and depends from each yoke independently of the load bar on which the motor power unit is mounted to thereby enable the endless belt of the motor unit to maintain a predetermined tractive effort independent of magnitude of the load suspended from the trolley yokes.

2. In a driving mechanism for monorail trolleys, pairs of wheels arranged to travel along a monorail, a yoke depending from each pair of wheels, a load-bar including an intermediate frame portion and draw-bar end portions with the latter extending through said yokes, a motor power unit supported on the intermediate frame portion of the load-bar and including an endless drive belt and operating means therefor, spring devices carried by said yokes engageable with the draw-bar end portions to force the draw-bar upwardly to hold the upper run of the endless belt of the power unit into driving frictional contact with the lower surface of the bottom flange of the monorail, means for retaining the load bar, yokes and spring devices in assembled relation, and load suspension means carried by each yoke independently of the load bar whereby the upper run of the endless belt maintains a definite driving frictional contact with the underside of the lower flange of the monorail regardless of magnitude of the load suspended from said trolley yokes.

RUSSELL E. NELLES.